United States Patent
Mao

(10) Patent No.: US 11,202,072 B2
(45) Date of Patent: Dec. 14, 2021

(54) VIDEO ENCODING METHOD, APPARATUS, AND DEVICE, AND STORAGE MEDIUM

(71) Applicant: TENCENT TECHNOLOGY (SHENZHEN) COMPANY LIMITED, Shenzhen (CN)

(72) Inventor: Xunan Mao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/859,947

(22) Filed: Apr. 27, 2020

(65) Prior Publication Data

US 2020/0260085 A1 Aug. 13, 2020

Related U.S. Application Data

(63) Continuation of application No. PCT/CN2018/108847, filed on Sep. 29, 2018.

(30) Foreign Application Priority Data

Jan. 16, 2018 (CN) .......................... 201810039100.3

(51) Int. Cl.
*H04N 19/124* (2014.01)
*H04N 19/105* (2014.01)
*H04N 19/136* (2014.01)

(52) U.S. Cl.
CPC ......... *H04N 19/124* (2014.11); *H04N 19/105* (2014.11); *H04N 19/136* (2014.11)

(58) Field of Classification Search
None
See application file for complete search history.

(56) References Cited

U.S. PATENT DOCUMENTS

| 7,502,517 B2 | 3/2009 | Kodama et al. |
| 2012/0294355 A1 | 11/2012 | Holcomb et al. |

(Continued)

FOREIGN PATENT DOCUMENTS

| CN | 103686169 A | 3/2014 |
| CN | 103843338 A | 6/2014 |

(Continued)

OTHER PUBLICATIONS

International Search Report Issued in PCT/CN2018/108847 dated Dec. 20, 2018, with English Machine Translation (5 pages).

(Continued)

*Primary Examiner* — Christopher G Findley
(74) *Attorney, Agent, or Firm* — Oblon, McClelland, Maier & Neustadt, L.L.P.

(57) ABSTRACT

A video encoding method of a video encoding apparatus is provided. In the method, an intra-frame pre-coding cost of a video frame is calculated. The intra-frame pre-coding cost indicates an amount of information in the video frame and a spatial correlation degree of the information in a plurality of code blocks of the video frame. A quantization parameter threshold of the video frame is set according to the intra-frame pre-coding cost. A quantization parameter estimation value of the video frame is calculated. The quantization parameter estimation value indicates a predicted compression status of the information in the video frame. A target encoding manner of the video frame is determined according to the quantization parameter threshold and the quantization parameter estimation value. The target encoding manner is one of a plurality of encoding manners including full-resolution encoding and downsampling encoding.

20 Claims, 5 Drawing Sheets

(56) References Cited

U.S. PATENT DOCUMENTS

2015/0189297 A1* 7/2015 Chevance ............ H04N 19/196
                                                    375/240.03
2016/0301931 A1* 10/2016 Wen ..................... H04N 19/124
2018/0324439 A1* 11/2018 Wu ...................... H04N 19/146

FOREIGN PATENT DOCUMENTS

| CN | 106961603 A | 7/2017 |
|----|-------------|--------|
| CN | 107155107 A | 9/2017 |

OTHER PUBLICATIONS

Written Opinion Issued in PCT/CN2018/108847 dated Dec. 20, 2018 (3 pages).
Afonso et al.—"Low Complexity Video Coding Based on Spatial Resolution Adaptation", 2017 IEEE International Conference on Image Processing (ICIP), IEEE, Feb. 22, 2018, pp. 3011-3015.
Notice of Reasons for Refusal dated Aug. 24, 2021 issued in corresponding Japanese patent application No. 2020-558668 with machine translation.

* cited by examiner

VIDEO ENCODING METHOD, APPARATUS, AND DEVICE, AND STORAGE MEDIUM

RELATED APPLICATION

This application is a continuation of International Application No. PCT/CN2018/108847, filed on Sep. 29, 2018, which claims priority to Chinese Patent Application No. 201810039100.3, entitled "VIDEO ENCODING METHOD, APPARATUS, DEVICE, AND STORAGE MEDIUM" and filed on Jan. 16, 2018. The entire disclosures of the prior applications are hereby incorporated by reference in their entirety.

FIELD OF THE TECHNOLOGY

Embodiments of this application relates to the field of video encoding technologies, and in particular, to a video encoding method, apparatus, and device, and a storage medium.

BACKGROUND OF THE DISCLOSURE

With the continuous development of multimedia technologies, application scenarios of video become increasingly wider. For example, a user may watch streaming videos online, and may further make video calls with others.

When a video frame in the video is encoded, common encoding manners include full-resolution encoding and downsampling encoding. In a full-resolution encoding mode, an encoder directly encodes the video frame. In a downsampling encoding mode, the encoder first performs downsampling on the video frame, and then encodes the downsampled video frame. In the downsampling process, some image details may be lost. Therefore, in the related art, the encoder performs full-resolution encoding on an I frame in the video, and performs downsampling encoding on a P frame in the video.

However, when the video frame is encoded by using the foregoing encoding manner, the video encoding effect is poor because image characteristics of the video frame are not considered.

SUMMARY

Embodiments of this application provide a video encoding method, apparatus, device, and a storage medium, which can resolve the problem that the video encoding effect is poor because image characteristics of a video frame are not considered when full-resolution encoding is performed on an I frame in a video, and downsampling encoding is performed on a P frame in the video. The technical solutions are as follows:

According to one aspect, a video encoding method is provided. The method can be performed by processing circuitry of a video encoding apparatus. In the method, an intra-frame pre-coding cost of a video frame is calculated. The intra-frame pre-coding cost indicates an amount of information in the video frame and a spatial correlation degree of the information in a plurality of code blocks of the video frame. A quantization parameter threshold of the video frame is set according to the intra-frame pre-coding cost. A quantization parameter estimation value of the video frame is calculated. The quantization parameter estimation value indicates a predicted compression status of the information in the video frame. A target encoding manner of the video frame is determined according to the quantization parameter threshold and the quantization parameter estimation value. The target encoding manner is one of a plurality of encoding manners including full-resolution encoding and downsampling encoding.

According to an embodiment of the determining the target encoding manner of the video frame. The target encoding manner is determined as the downsampling encoding in a case that the quantization parameter estimation value is greater than the quantization parameter threshold. The target encoding manner is determined as the full-resolution encoding in a case that the quantization parameter estimation value is less than the quantization parameter threshold.

According to an embodiment of the calculating the intra-frame pre-coding cost of the video frame. Downsampling is performed on the video frame. The downsampled video frame is divided into the plurality of code blocks, and the plurality of code blocks is pre-coded, to calculate pre-coding costs of the plurality of code blocks. The intra-frame pre-coding cost is determined based on a sum of the pre-coding costs of the plurality of code blocks.

According to an embodiment of the setting the quantization parameter threshold of the video frame. An average intra-frame pre-coding cost of each pixel is calculated according to the intra-frame pre-coding cost and a quantity of pixels of the video frame. The quantization parameter threshold is set as a first value in a case that the average intra-frame pre-coding cost is greater than a cost threshold. The quantization parameter threshold is set as a second value in a case that the average intra-frame pre-coding cost is less than the cost threshold. The first value is greater than the second value.

According to an embodiment of the calculating the quantization parameter estimation value of the video frame, the quantization parameter estimation value is determined as a preset quantization parameter in a case that the video frame is a first frame of a frame sequence. The quantization parameter estimation value is determined according to an encoding mode used by an encoder in a case that the video frame is not the first frame of the frame sequence. The encoding mode is one of fixed quality encoding and fixed code rate encoding. The fixed quality encoding maintains a fixed video picture quality, and the fixed code rate encoding maintains a fixed video code rate.

According to an embodiment of the determining the quantization parameter estimation value according to the encoding mode, the quantization parameter estimation value is determined as an external preset value of the encoder in a case that the encoding mode is the fixed quality encoding. The external preset value is a quantization parameter preset by the encoder. A quantization parameter of a code block of the plurality of code blocks in the video frame is calculated in a case that the encoding mode is the fixed code rate encoding, and the quantization parameter of the code block is determined as the quantization parameter estimation value. The code block is a first code block of the video frame.

According to an embodiment of the calculating the quantization parameter of the code block of the plurality of code blocks in the video frame, a first quantization parameter offset and a second quantization parameter offset are obtained. The first quantization parameter offset is a difference between a downsampling encoding quantization parameter and a full-resolution encoding quantization parameter. The second quantization parameter offset is a difference between an I-frame quantization parameter and a P-frame quantization parameter. An average quantization parameter of a previous frame of the video frame is calculated. The average quantization parameter is an average value of quantization parameters of a plurality of code blocks in the previous frame. The quantization parameter of the code block is determined based on a sum of the average quantization parameter, the first quantization parameter offset, and the second quantization parameter offset in a case that the previous frame is an I frame and uses the downsampling encoding. The quantization parameter of the code block is determined based on a sum of the average quantization parameter and the second quantization parameter offset in a case that the previous frame is an I frame and uses the full-resolution encoding. The quantization parameter of the code block is determined based on a sum of the average quantization parameter and the first quantization parameter offset in a case that the previous frame is a P frame and uses the downsampling encoding. The quantization parameter of the code block is determined based on the average quantization parameter as in a case that the previous frame is a P frame and uses the full-resolution encoding.

According to an embodiment, the quantization parameter estimation value is corrected according to the first quantization parameter offset in a case that the video frame uses the downsampling encoding. The video frame is encoded according to the corrected quantization parameter.

According to an embodiment, the information in the video frame corresponds to pixels in the video frame.

According to another aspect, a video encoding apparatus including processing circuitry is provided. The processing circuitry is configured to calculate an intra-frame pre-coding cost of a video frame. The intra-frame pre-coding cost indicates an amount of information in the video frame and a spatial correlation degree of the information in a plurality of code blocks of the video frame. The processing circuitry is configured to set a quantization parameter threshold of the video frame according to the intra-frame pre-coding cost, and calculate a quantization parameter estimation value of the video frame. The quantization parameter estimation value indicates a predicted compression status of the information in the video frame. The processing circuitry is configured to determine a target encoding manner of the video frame according to the quantization parameter threshold and the quantization parameter estimation value. The target encoding manner is one of a plurality of encoding manners including full-resolution encoding and downsampling encoding.

According to an embodiment, the processing circuitry is configured to determine the target encoding manner is the downsampling encoding in a case that the quantization parameter estimation value is greater than the quantization parameter threshold, and determine the target encoding manner is the full-resolution encoding in a case that the quantization parameter estimation value is less than the quantization parameter threshold.

According to an embodiment, the processing circuitry is configured to perform downsampling on the video frame. The processing circuitry is configured to divide the downsampled video frame into the plurality of code blocks, and pre-code the plurality of code blocks, to calculate pre-coding costs of the plurality of code blocks. The processing circuitry is configured to determine the intra-frame pre-coding cost based on a sum of the pre-coding costs of the plurality of code blocks.

According to an embodiment, the processing circuitry is configured to calculate an average intra-frame pre-coding cost of each pixel according to the intra-frame pre-coding cost and a quantity of pixels of the video frame, set the quantization parameter threshold as a first value in a case that the average intra-frame pre-coding cost is greater than a cost threshold, and set the quantization parameter threshold as a second value in a case that the average intra-frame pre-coding cost is less than the cost threshold. The first value is greater than the second value.

According to an embodiment, the processing circuitry is configured to determine the quantization parameter estimation value is a preset quantization parameter in a case that the video frame is a first frame of a frame sequence, and determine the quantization parameter estimation value according to an encoding mode used by an encoder in a case that the video frame is not the first frame of the frame sequence. The encoding mode is one of fixed quality encoding and fixed code rate encoding. The fixed quality encoding maintains a fixed video picture quality, and the fixed code rate encoding maintains a fixed video code rate.

According to an embodiment, the processing circuitry is configured to determine the quantization parameter estimation value is an external preset value of the encoder in a case that the encoding mode is the fixed quality encoding, the external preset value being a quantization parameter preset by the encoder. The processing circuitry is configured to calculate a quantization parameter of a code block of the plurality of code blocks in the video frame in a case that the encoding mode is the fixed code rate encoding, and determine the quantization parameter of the code block as the quantization parameter estimation value. The code block is a first code block of the video frame.

According to an embodiment, the processing circuitry is configured to obtain a first quantization parameter offset and a second quantization parameter offset. The first quantization parameter offset is a difference between a downsampling encoding quantization parameter and a full-resolution encoding quantization parameter, and the second quantization parameter offset is a difference between an I-frame quantization parameter and a P-frame quantization parameter. The processing circuitry is configured to calculate an average quantization parameter of a previous frame of the video frame. The average quantization parameter is an average value of quantization parameters of a plurality of code blocks in the previous frame. The processing circuitry is configured to determine the quantization parameter of the code block based on a sum of the average quantization parameter, the first quantization parameter offset, and the second quantization parameter offset in a case that the previous frame is an I frame and uses the downsampling encoding. The processing circuitry is configured to determine the quantization parameter of the code block based on a sum of the average quantization parameter and the second quantization parameter offset in a case that the previous frame is an I frame and uses the full-resolution encoding. The processing circuitry is configured to determine the quantization parameter of the code block based on a sum of the average quantization parameter and the first quantization parameter offset in a case that the previous frame is a P frame and uses the downsampling encoding. The processing circuitry is configured to determine the quantization parameter of the code block based on the average quantization parameter as in a case that the previous frame is a P frame and uses the full-resolution encoding.

According to an embodiment, the processing circuitry is configured to correct the quantization parameter estimation value according to the first quantization parameter offset in a case that the video frame uses the downsampling encoding. The processing circuitry is configured to encode the video frame according to the corrected quantization parameter.

According to an embodiment, the information in the video frame corresponds to pixels in the video frame.

According to another aspect, a video encoding device is provided, including a processor and a memory, the memory storing at least one instruction, at least one program, and a code set or an instruction set, and the at least one instruction, the at least one program, and the code set or the instruction set being executed by the processor to implement the video encoding method according to the foregoing aspect.

According to another aspect, a computer-readable storage medium is provided, the storage medium storing at least one instruction, at least one program, and a code set or an instruction set, the at least one instruction, the at least one program, and the code set or the instruction set being executed by a processor to perform the video encoding method according to the foregoing aspect.

In the embodiments of this application, before a video frame is encoded, pre-coding analysis is first performed on the video frame, to obtain an intra-frame pre-coding cost of the video frame, so that a quantization parameter threshold of the video frame is set according to the intra-frame pre-coding cost. During determining of an encoding manner used for encoding the video frame, a full-resolution or downsampling manner is used for encoding the video frame by comparing magnitudes of a quantization parameter estimation value and the quantization parameter threshold of the video frame. Compared with an encoding manner used in the related art, in the embodiments, richness and a compression status of details of the current video frame are considered in an encoding manner selecting process, so that the finally determined encoding manner accords with image characteristics of the video frame, thereby improving the video encoding effect.

BRIEF DESCRIPTION OF THE DRAWINGS

To describe the technical solutions in the embodiments of the present disclosure more clearly, the following briefly describes the accompanying drawings required for describing the embodiments. The accompanying drawings in the following description show some embodiments of the present disclosure, and a person of ordinary skill in the art may still derive other drawings from these accompanying drawings.

DESCRIPTION OF EMBODIMENTS

Figure 1:
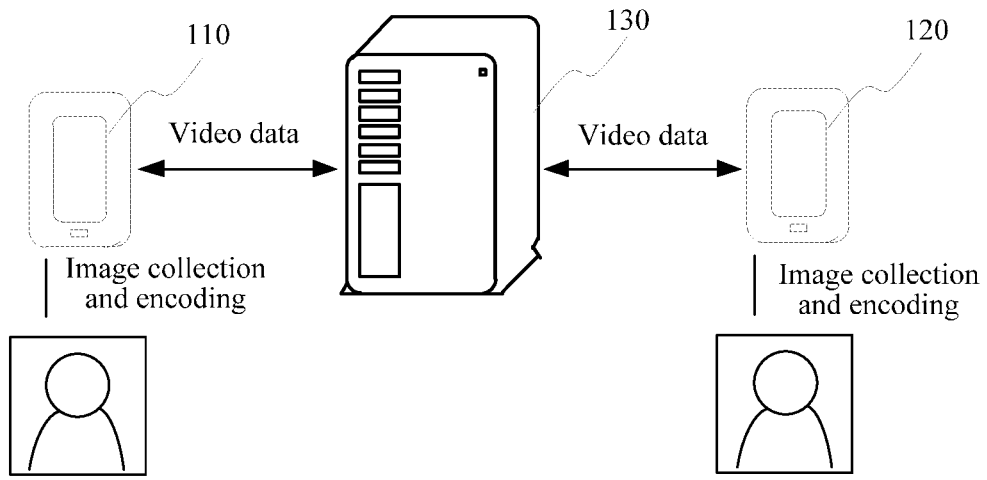
FIG. 1 is a schematic diagram of an implementation environment involved by a video encoding method according to an embodiment of this application.

To make the objectives, technical solutions, and advantages of the present disclosure clearer, the following further describes the implementations of the present disclosure in detail with reference to the accompanying drawings.

"Plurality of" mentioned in the specification means two or more. The "and/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

To facilitate understanding, the following explains terms involved in the embodiments of this application.

Video frame: a basic unit of a video, where the video is a frame sequence formed by several video frames.

Intra-frame pre-coding: video frame sequence images have a strong correlation in space. For example, in one video frame, a background of the video frame is a wall with same patterns and textures. Therefore, when the video frame is divided into several code blocks, code blocks related to the wall may display same or similar information, and an intra-frame pre-coding technology may be used to pre-code blocks that have a high spatial correlation degree. Correspondingly, an intra-frame pre-coding cost is used for representing richness and a spatial correlation degree of details in the video frame. The richness of the details is used for representing an amount of information stored in the video frame. A larger amount of information stored in the video frame indicates higher richness of the details in the video frame and correspondingly a higher intra-frame pre-coding cost of the video frame. The spatial correlation degree is used for representing a correlation degree of information stored in different code blocks in the video frame. A higher correlation degree of the information stored in different code blocks indicates a higher spatial correlation degree of the video frame, and a lower intra-frame pre-coding cost of the video frame. In addition, to achieve pre-determined video quality, a higher intra-frame pre-coding cost needs a higher code rate. Conversely, a lower intra-frame pre-coding cost needs a lower code rate.

Quantization parameter (QP): used for representing a compression status of details in a video frame. In related code rate control algorithms, target code rate control is implemented by adjusting a magnitude of a quantization parameter of discrete cosine transformation. A smaller quantization parameter indicates a higher code rate of the video frame, and more details retained in the video frame (i.e., finer quantization indicates a lower distortion degree). A larger quantization parameter indicates a lower code rate of the video frame, and a heavier loss of details in the video frame (i.e., coarser quantization indicates a higher distortion degree). Generally, a value range of the quantization parameter is 0 to 51.

Fixed quality encoding: a video encoding mode, where when the fixed quality encoding is used, quantization parameters corresponding to all code blocks in a video frame are the same, thereby achieving a consistent visual effect.

Fixed code rate encoding: a video encoding mode, where when the fixed code rate encoding is used, a bit rate of a video is constant, such as 800 kbps.

I frame: also referred to as an intra-prediction frame, and refers to a fully encoded video frame in a video frame sequence. When the I frame is decoded, only data of the frame is needed, and no reference needs to be made to other frames.

P frame: also referred to as an inter-prediction frame or a forward-predicted frame, and used for representing a difference between a current frame and a previous key frame (I frame or P frame). When the P frame is decoded, data of a previous key frame is needed.

FIG. 1 is a schematic diagram of an implementation environment, or system, involved by a video encoding method according to an embodiment of this application. The implementation environment includes: a first terminal 110, a second terminal 120, and a server 130.

In a video communication scenario, the first terminal 110 and the second terminal 120 are electronic devices that are installed with video communication applications. The electronic devices are smartphones, tablet computers, personal computers, and the like. The first terminal 110 and the second terminal 120 are respectively connected to the server 130 through a wired or wireless network.

The server 130 is a background server of the video communication applications. The background server may be one server, a server cluster formed by several servers, or a cloud computing center.

When a first user using the first terminal 110 performs video communication with a second user using the second terminal 120, the first terminal 110 performs video encoding on a collected image, and transmits encoded video data to the second terminal 120 by using the server 130, so that the second terminal 120 may decode and display the received video data (a manner in which the second terminal 120 transmits video data to the first terminal 110 is the same). The video encoding method provided in this embodiment of the present disclosure is applied to the first terminal 110 or the second terminal 120.

In another possible application scenario (an online video playing scenario), the first terminal 110 and the second terminal 120 are installed with video playing applications, and the server 130 is a background server of the video communication applications. The first terminal 110 and the second terminal 120 respectively establish a network connection with the server 130, and receive the encoded video data that is transmitted by the server 130, thereby decoding and playing the video data. The video encoding method is applied to the server 130.

Optionally, the wireless or wired network uses a standard communications technology and/or protocol. The network is generally the Internet, but may be any other network, including but not limited to a local area network (LAN), a metropolitan area network (MAN), a wide area network (WAN), a mobile, wired, or wireless network, or any combination of a dedicated network or a virtual dedicated network). In some embodiments, technologies and/or formats such as hypertext markup language (HTML) and extensible markup language (XML) are used for representing data exchanged through a network. In addition, all or some links may be encrypted by using encryption technologies such as a secure socket layer (SSL), transport layer security (TLS), a virtual private network (VPN), and internet protocol security (IPsec). In some other embodiments, custom and/or dedicated data communication technologies may also be used in place of or in addition to the foregoing data communication technologies.

For convenience of description, the following embodiments are described through an example in which a video encoding method is applied to a video encoding device.

The video encoding method provided in the embodiments of this application may be used in a scenario in which a video needs to be encoded. The method is applied to a video encoding device. The video encoding device may be a mobile terminal installed with video codec software, or may be a server having a video codec function. By using the foregoing method, encoding quality of the video encoding device can be improved. For convenience of description, the following embodiments are described through an example in which a video encoding method is applied to a video encoding device.

Optionally, the video encoding method can be applied to the following product scenarios:

A video call scenario in an instant messaging application.

An instant messaging application may generally provide a video call function. When the video call function is used, a mobile terminal may encode a collected video frame, and transmit encoded video frame data to a server. The server transmits the video frame data to a peer mobile terminal, so that the peer mobile terminal decodes and displays the data. Encoding quality of the mobile terminal for the video frame will directly affect quality of a video call. By using the video encoding method provided in the embodiments of this application, the mobile terminal can determine a target encoding manner that accords with image characteristics of the video frame according to a quantization parameter estimation value and a quantization parameter threshold of the video frame, and encode the video frame by using the target encoding manner, thereby improving video encoding quality of the mobile terminal, and finally improving the quality of the video call.

A video encoding scenario in a video shooting application.

In a process of shooting by using a video shooting application, a terminal may encode a collected video frame, thereby generating a corresponding video file when the shooting is finished. When video encoding is performed by using the video encoding method provided in the embodiments of this application, a video encoding device may determine the most suitable target encoding manner according to image characteristics of a current video frame, and encode the current video frame by using the target encoding manner, thereby improving video encoding quality of the mobile terminal, and finally improving quality of the generated video file.

The product scenarios are merely used as examples. In other possible implementations, scenarios involved by video encoding may use the video encoding method provided in the embodiments of this application. This is not limited in the embodiments of this application.

Figure 2:
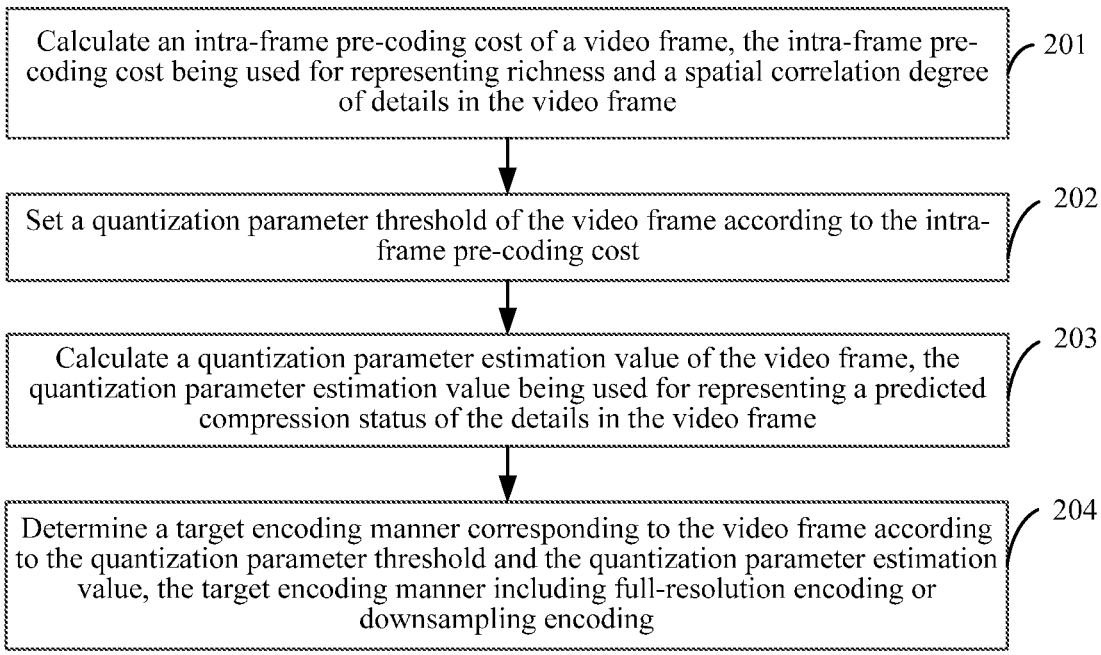
FIG. 2 is a flowchart of a video encoding method according to an embodiment of this application.

FIG. 2 is a flowchart of a video encoding method according to an embodiment of this application. This embodiment is described by using an example in which the video encoding method is applied to a video encoding device. The method can include the following steps.

In step 201, the video encoding device calculates an intra-frame pre-coding cost of a video frame. The intra-frame pre-coding cost is used to represent richness and a spatial correlation degree of details in the video frame. For example, the intra-frame pre-coding cost can indicate an amount of information in the video frame and/or a spatial correlation degree of the information in a plurality of code blocks of the video frame. The amount of information can correspond to an amount of detail in the video frame. The information in the video frame can correspond to pixels in the video frame.

The intra-frame pre-coding cost of the video frame is related to a code rate required for encoding. A larger intra-frame pre-coding cost indicates richer details in the video frame, and a lower spatial correlation degree of the details. Therefore, to achieve certain video quality, a code rate required for encoding is higher. Conversely, a smaller intra-frame pre-coding cost indicates a lower code rate required for encoding.

After a video frame in a video frame sequence is obtained, the video encoding device assumes that the video frame is an I frame, and performs intra-frame pre-coding analysis on the video frame, thereby obtaining an intra-frame pre-coding cost of the video frame through calculation. Subsequently, the video encoding device sets a quantization parameter threshold of the video frame based on the intra-frame pre-coding cost.

For a specific manner used for performing the intra-frame pre-coding analysis, in a possible implementation, this step includes the following steps.

1. Perform downsampling on the video frame.

Optionally, the video encoding device performs 2:1 downsampling on the video frame, that is, both a length and a width of the video frame are reduced by one half, to obtain the downsampled video frame. The video encoding device may perform the downsampling by using algorithms such as direct average, bicubic interpolation, and bilinear interpolation. A specific algorithm of the downsampling and a downsampling proportion are not limited in this embodiment.

2. Divide the downsampled video frame into a plurality of code blocks, and pre-code the code blocks, to calculate pre-coding costs of the code blocks.

For the downsampled video frame, to reduce the pre-coding analysis difficulty, the video encoding device divides the video frame into code blocks of pre-determined sizes, thereby pre-coding the code blocks, to obtain pre-coding costs of the code blocks.

Optionally, the video encoding device divides the downsampled video frame into 8×8 code blocks (whose unit is pixel), and sequentially calculates pre-coding costs of the code blocks. When a length or a width of the downsampled video frame is not an integer multiple of 8, the video encoding device performs edge expansion processing on the downsampled video frame, and then divides the video frame obtained after the edge expansion processing.

For a calculation manner of the pre-coding cost, in a possible implementation, the video encoding device determines a sum of absolute values of prediction residuals of pixels in a code block as a pre-coding cost of the code block. In another possible implementation, the video encoding device calculates the pre-coding cost according to a formula cost=D+λR. cost is the pre-coding cost, D is used for representing a distortion degree (which may be represented by a sum of absolute values of differences between all reconstructed images and initial images (e.g., all pixels) in the current code block, λ is a Lagrange constant, and R is a quantity of bits occupied by the code block.

3. Determine a sum of the pre-coding costs of the code blocks as the intra-frame pre-coding cost.

After the pre-coding costs of the code blocks are obtained through calculation, the video encoding device adds up the pre-coding costs, to obtain the intra-frame pre-coding cost I cost of the video frame.

In step 202, the video encoding device sets a quantization parameter threshold of the video frame according to the intra-frame pre-coding cost.

When video encoding is performed by using a downsampling encoding manner, the video frame needs at least one downsampling and one upsampling, and both the upsampling and the downsampling may cause a loss of the details in the video frame, leading to sawtooth distortion in an edge region of an image, thereby affecting video quality. In addition, a larger amount of information of the video frame leads to heavier distortion after downsampling encoding.

To avoid downsampling encoding on a video frame with a large amount of information subsequently, the video encoding device determines an amount of information of a current video frame according to an intra-frame pre-coding cost. Therefore, a relatively large quantization parameter threshold is set when the amount of information is relatively large, so that full-resolution encoding tends to be performed on the video frame subsequently (to avoid an information loss of the video frame). A relatively small quantization parameter threshold is set when the amount of information is relatively small, so that downsampling encoding tends to be performed on the video frame subsequently (when the amount of information of the video frame is relatively small, the downsampling encoding has a relatively small effect on distortion).

In step 203, the video encoding device calculates a quantization parameter estimation value of the video frame. The quantization parameter estimation value is used for representing a predicted compression status of the details in the video frame. For example, the quantization parameter estimation value can indicate a predicted compression status of the information in the video frame.

After obtaining the video frame, the video encoding device estimates a quantization parameter estimation value of the current video frame, thereby determining a predicted compression status of the details in the current video frame according to the quantization parameter estimation value. The predicted compression status of the details is used for reflecting a predicted loss status of the details. A heavier predicted compression status of the details indicates that more details are lost. Correspondingly, distortion of the video frame is more severe and quality of the video frame is reduced.

In a possible implementation, if the video frame is the first frame of a frame sequence, a preset quantization parameter is determined as the quantization parameter estimation value. The preset quantization parameter may be a fixed value, or may be obtained through calculation according to an average code rate of each pixel in the video frame.

If the video frame is not the first frame of the frame sequence, the quantization parameter estimation value is determined by an encoding mode used by an encoder. The encoding mode includes fixed quality encoding and fixed code rate encoding. For example, the encoding mode is one of the fixed quality encoding and the fixed code rate encoding. The fixed quality encoding refers to an encoding manner configured to maintain fixed video picture quality, and the fixed code rate encoding refers to an encoding manner configured to maintain a fixed video code rate.

There is no strict order between step 203 and steps 201 to 202. For example, step 203 may be simultaneously performed with steps 201 to 202. An execution time sequence between step 203 and steps 201 to 202 is not limited in this embodiment.

In step 204, the video encoding device determines a target encoding manner of, or corresponding to, the video frame according to the quantization parameter threshold and the quantization parameter estimation value. The target encoding manner includes full-resolution encoding or downsampling encoding. For example, the target encoding manner can be one of a plurality of encoding manners including the full-resolution encoding and the downsampling encoding.

After the quantization parameter threshold and the quantization parameter estimation value of the video frame are obtained through calculation, the video encoding device determines, by comparing magnitudes of the quantization parameter threshold and the quantization parameter estimation value, a target encoding manner used when the video frame is encoded.

In a possible implementation, the video encoding device determines the downsampling encoding as the target encoding manner in a case that the quantization parameter estimation value is greater than the quantization parameter threshold. The video encoding device determines the full-resolution encoding as the target encoding manner in a case that the quantization parameter estimation value is less than the quantization parameter threshold.

Further, after the video frame is encoded according to the determined target encoding manner, the video encoding device further performs, by using the encoder according to the quantization parameter estimation value, code rate control on the video frame that is encoded by using the target encoding manner (by using code control algorithm), and finally outputs video frame data.

Different from the related art, the full-resolution encoding is uniformly performed on I frames, and the downsampling encoding is uniformly performed on P frames. In this embodiment, the video encoding device avoids the downsampling encoding on a video frame with more details according to image characteristics of the video frame, thereby reducing distortion caused in an encoding process, and improving the video encoding effect.

In conclusion, in this embodiment, before a video frame is encoded, pre-coding analysis is first performed on the video frame, to obtain an intra-frame pre-coding cost of the video frame, so that a quantization parameter threshold of the video frame is set according to the intra-frame pre-coding cost. During determining of an encoding manner used for encoding the video frame, a full-resolution or downsampling manner is used for encoding the video frame by comparing magnitudes of a quantization parameter estimation value and the quantization parameter threshold of the video frame. Compared with an encoding manner used in the related art, in this embodiment, richness and a compression status of details of the current video frame are considered in an encoding manner selecting process, so that the finally determined encoding manner accords with image characteristics of the video frame, thereby improving the video encoding effect.

Figure 3:
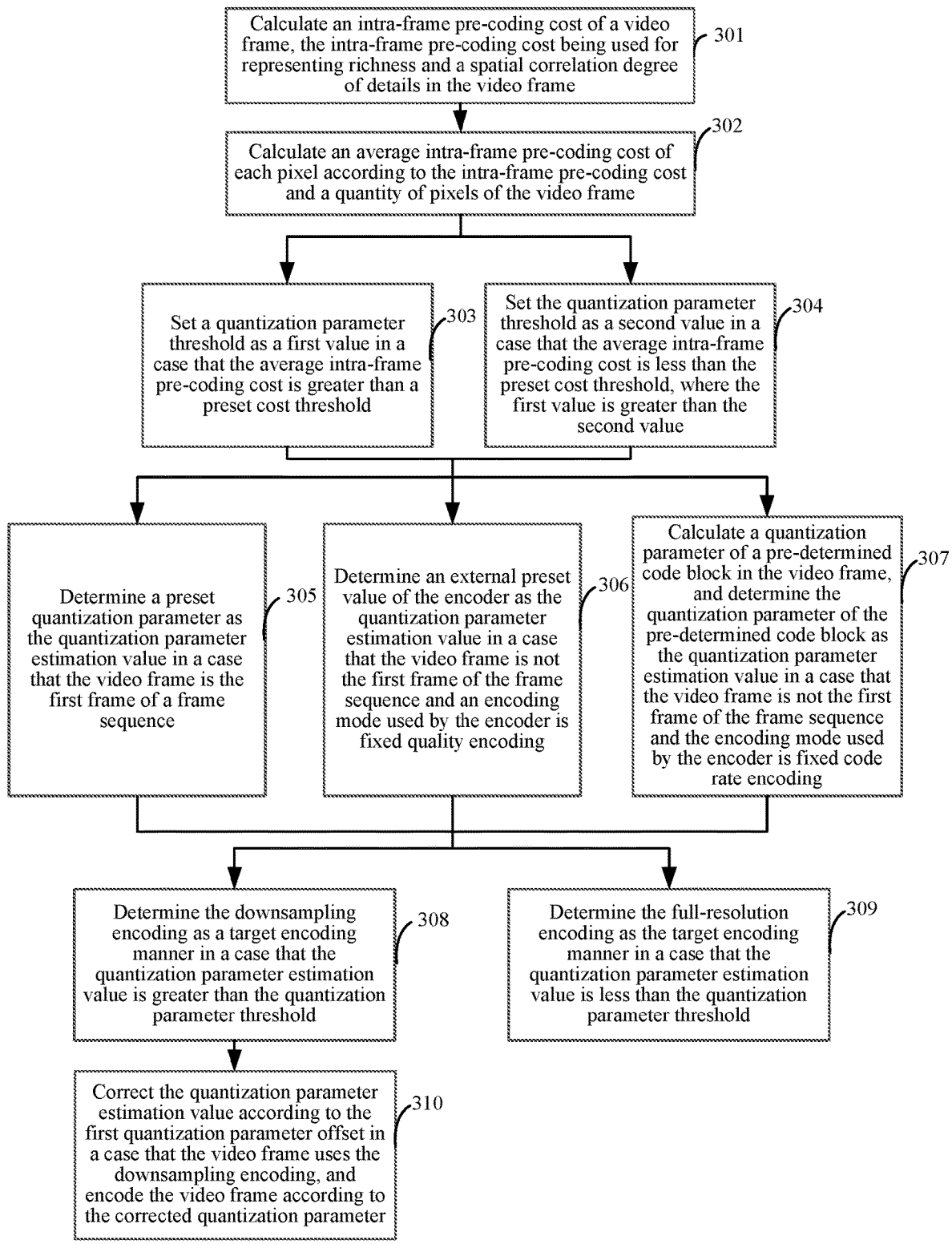
FIG. 3 is a flowchart of a video encoding method according to another embodiment of this application.

FIG. 3 is a flowchart of a video encoding method according to another embodiment of this application. This embodiment is described by using an example in which the video encoding method is applied to a video encoding device. The method can include the following steps.

In step 301, the video encoding device calculates an intra-frame pre-coding cost of a video frame. The intra-frame pre-coding cost is used to represent richness and a spatial correlation degree of details in the video frame.

An implementation of this step is similar to that of step 201, and details are not described again in this embodiment.

In step 302, the video encoding device calculates an average intra-frame pre-coding cost of each pixel according to the intra-frame pre-coding cost and a quantity of pixels of the video frame.

In a possible implementation, to show an amount of information (complexity of the details in the video frame) of the current video frame, the video encoding device further calculates an average intra-frame pre-coding cost of each pixel point according to an intra-frame pre-coding cost and a quantity of pixel points (i.e., a quantity of pixels) in the current video frame.

A smaller average intra-frame pre-coding cost indicates a smaller amount of information included by the video frame, and fewer image details (i.e., less information is lost when upsampling and downsampling are performed, and downsampling encoding is suitable for being used). Conversely, a larger average intra-frame pre-coding cost indicates a larger amount of information included by the video frame, and more image details (i.e., more information is lost when upsampling and downsampling are performed, and full-resolution encoding is suitable for being used).

For example, the average intra-frame pre-coding cost is $$IcostPerPixel = \frac{Icost}{width * height}$$

I cost is the intra-frame pre-coding cost of the video frame, width is a quantity of pixel points of the video frame in a horizontal direction, and height is a quantity of pixel points of the video frame in a vertical direction.

For example, when the video frame is an image frame collected by using a camera, width*height is a resolution of the camera, such as 1080×720.

In step 303, the video encoding device sets a quantization parameter threshold as a first value in a case that the average intra-frame pre-coding cost is greater than a preset cost threshold.

In step 304, the video encoding device sets the quantization parameter threshold as a second value in a case that the average intra-frame pre-coding cost is less than the preset cost threshold, where the first value is greater than the second value.

For an implementation of setting the quantization parameter threshold, in a possible implementation, the video encoding device sets a cost threshold in advance, and detects whether the average intra-frame pre-coding cost of the current video frame is greater than a preset cost threshold. If yes, it indicates that an amount of information of the current video frame is relatively large. To make the full-resolution encoding tend to be selected subsequently (a distortion degree is relatively high during the downsampling encoding), the video encoding device sets a relatively large quantization parameter threshold for the video frame. If not, it indicates that an amount of information of the current video frame is relatively small. To make the downsampling encoding tend to be selected subsequently, the video encoding device sets a relatively small quantization parameter threshold for the video frame.

For example, a formula of setting the quantization parameter threshold $QP_{TH}$ is as follows.

$$QP_{TH} = \begin{cases} 33, & IcostPerPixel < 1.2 \\ 36, & IcostPerPixel \geq 1.2 \end{cases}$$

In other possible implementations, the video encoding device may further set two or more cost thresholds in advance, and set different quantization parameter thresholds for different cost threshold intervals. This embodiment is described by using an example in which only one cost threshold is set, but does not a constitute limitation on this.

Through steps 301 to 304, the video encoding device sets a quantization parameter threshold corresponding to the current video frame according to image characteristics (including a magnitude of an amount of information) of the current video frame. Further, the video encoding device calculates a quantization parameter estimation value of the video frame through steps 305 to 307.

There is no strict order between steps 301 to 304 and steps 305 to 307. For example, steps 301 to 304 may be simultaneously preformed with steps 305 to 307. This is not limited in this embodiment.

In step 305, the video encoding device determines a preset quantization parameter as the quantization parameter estimation value in a case that the video frame is the first frame of a frame sequence.

When obtaining the video frame, the video encoding device first detects whether the video frame is the first frame of a frame sequence. If yes, the preset quantization parameter is determined as the quantization parameter estimation value of the video frame. If not, the quantization parameter estimation value of the video frame is further determined according to an encoding mode used by an encoder. For example, step 306 or 307 is performed.

In a possible implementation, the preset quantization parameter may be a fixed value (e.g., 35) that is set in advance, or may be obtained through calculation according to a target code rate, a frame rate, and a resolution.

For example, the video encoding device obtains an average code rate of each pixel point in the video frame by calculating target code rate/frame rate/resolution, thereby setting a quantization parameter estimation value of the first frame according to the average code rate. A code rate control algorithm may be used to set the quantization parameter according to the average code rate. Details are not described again in this embodiment.

In step 306, the video encoding device determines an external preset value of the encoder as the quantization parameter estimation value in a case that the video frame is not the first frame of the frame sequence and an encoding mode used by the encoder is fixed quality encoding.

If the current video frame is not the first frame of the frame sequence, the video encoding device assumes that the current video frame uses full-resolution encoding, and further obtains an encoding mode used by the encoder, thereby setting the quantization parameter estimation value of the video frame based on the encoding mode.

When the encoding mode used by the encoder is fixed quality encoding, the encoder performs encoding based on a uniform quantization parameter. For example, quantization parameters of all code blocks in the video frame are the same, so that the video encoding device determines an external preset value of the encoder (e.g., quantization parameters preset by the encoder) as the quantization parameter estimation value.

In step 307, the video encoding device calculates a quantization parameter of a pre-determined code block in the video frame, and determines the quantization parameter of the pre-determined code block as the quantization parameter estimation value in a case that the video frame is not the first frame of the frame sequence and the encoding mode used by the encoder is fixed code rate encoding.

When the encoding mode used by the encoder is fixed code rate encoding (an output code rate is controlled to be constant by adjusting a quantization parameter of the video frame), the video encoding device determines the quantization parameter of the pre-determined code block in the video frame as the quantization parameter estimation value of the video frame. The pre-determined code block may be the first code block of the video frame.

Figure 4:
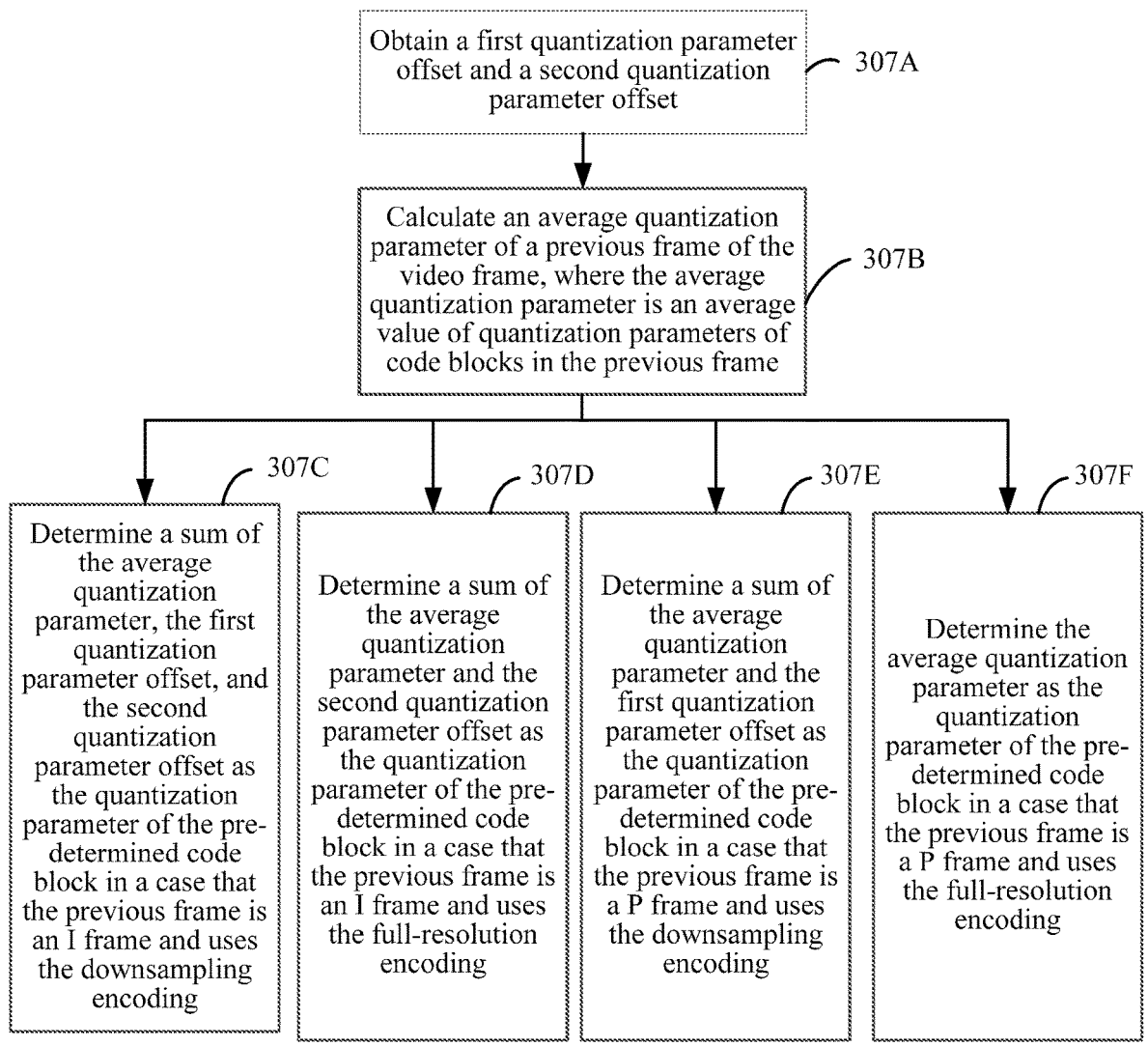
FIG. 4 is a flowchart of an exemplary video encoding device for calculating a quantization parameter estimation value of a current video frame according to a previous frame.

In a possible implementation, the video encoding device calculates a quantization parameter of a first code block in the video frame based on a previous frame of the current video frame. For example, as shown in FIG. 4, this step can include the following steps.

In step 307A, the video encoding device obtains a first quantization parameter offset and a second quantization parameter offset, where the first quantization parameter offset is a difference between a downsampling encoding quantization parameter and a full-resolution encoding quantization parameter, and the second quantization parameter offset is a difference between an I-frame quantization parameter and a P-frame quantization parameter.

To maintain stable video quality during switching of the downsampling encoding and the full-resolution encoding, to avoid an abrupt change in the video quality, the video encoding device sets a first quantization parameter offset $QP_{delta}$ in advance. The first quantization parameter offset is a difference between a full-resolution encoding quantization parameter (a quantization parameter used for code rate control during the full-resolution encoding) and a downsampling encoding quantization parameter (a quantization parameter used for code rate control during the downsampling encoding). A value of $QP_{delta}$ may be 5, 6, or 7.

Optionally, a value obtained by subtracting the first quantization parameter offset from the full-resolution encoding quantization parameter may be used as the downsampling encoding quantization parameter. Conversely, a value obtained by adding the downsampling encoding quantization parameter with the first quantization parameter offset may be used as the full-resolution encoding quantization parameter.

At the same time, to improve overall compression efficiency of a video, the video encoding device sets a second quantization parameter offset $QP_{offset\_I/P}$ in advance. The second quantization parameter offset is a difference between an I-frame quantization parameter (a quantization parameter used for code rate control on an I frame) and a P-frame quantization parameter (a quantization parameter used for code rate control on a P frame). A value of $QP_{offset\_I/P}$ may be 1, 2, or 3.

Before the quantization parameter of the first code block in the video frame is calculated, the video encoding device obtains the first quantization parameter offset and the second quantization parameter offset.

For example, the video encoding device obtains $QP_{delta}=6$ and $QP_{offset\_I/P}=2$.

In step 307B, the video encoding device calculates an average quantization parameter of a previous frame of the video frame, where the average quantization parameter is an average value of quantization parameters of code blocks in the previous frame.

Because the current video frame is not the first frame, that is, a previous frame exists, and the previous frame has been encoded, in a possible implementation, the video encoding device obtains quantization parameters of code blocks in the previous frame from encoded information, thereby calculating an average quantization parameter of the previous frame according to the quantization parameters of the code blocks. Because pictures of consecutive video frames are consecutive and similar, the video encoding device may determine a quantization parameter estimation value of the current video frame based on the average quantization parameter of the previous frame, thereby reducing processing resources consumed during encoding, and improving accuracy of the quantization parameter estimation value.

For example, the average quantization parameter of the previous frame calculated by the video encoding device is 30.

The video encoding device calculates, based on the average quantization parameter of the previous frame, the quantization parameter of the first code block according to a frame type of the previous frame (I frame or P frame) and a used encoding manner (full-resolution encoding or downsampling encoding).

Optionally, if the previous frame is detected as an I frame, the video encoding device performs step 307C or 307D. If the previous frame is detected as a P frame, the video encoding device performs step 307E or 307F.

In step 307C, the video encoding device determines a sum of the average quantization parameter, the first quantization parameter offset, and the second quantization parameter offset as the quantization parameter of the pre-determined code block in a case that the previous frame is an I frame and uses the downsampling encoding.

In a case that the previous frame is an I frame and uses the downsampling encoding, the video encoding device performs offset calculation on the average quantization parameter according to the first quantization parameter offset and the second quantization parameter offset to obtain the quantization parameter of the pre-determined code block.

For example, the video encoding device obtains encoding information of the previous frame. The encoding information indicates that the previous frame is an I frame, and uses the downsampling encoding, the quantization parameter of the pre-determined code block is calculated as 30+6+2=38 with reference to the examples in steps 307A and 307B.

In step 307D, the video encoding device determines a sum of the average quantization parameter and the second quantization parameter offset as the quantization parameter of the pre-determined code block in a case that the previous frame is an I frame and uses the full-resolution encoding.

Different from step 307C, in a case that the previous frame is an I frame and uses the full-resolution encoding, a terminal does not need to perform offset processing on the average quantization parameter by using the first quantization parameter offset, that is, directly determines a sum of the average quantization parameter and the second quantization parameter offset as the quantization parameter of the pre-determined code block.

For example, the video encoding device calculates the quantization parameter of the pre-determined code block as 30+2=32 with reference to the examples in steps 307A and 307B in a case that the previous frame is an I frame and uses the full-resolution encoding.

In step 307E, the video encoding device determines a sum of the average quantization parameter and the first quantization parameter offset as the quantization parameter of the pre-determined code block in a case that the previous frame is a P frame and uses the downsampling encoding.

In a case that the previous frame is a P frame and uses the downsampling encoding, the video encoding device performs offset calculation on the average quantization parameter according to the first quantization parameter offset, to obtain the quantization parameter of the pre-determined code block.

For example, the video encoding device calculates the quantization parameter of the pre-determined code block as 30+6=36 with reference to the examples in steps 307A and 307B in a case that the previous frame is a P frame and uses the downsampling encoding.

In step 307F, the video encoding device determines the average quantization parameter as the quantization parameter of the pre-determined code block in a case that the previous frame is a P frame and uses the full-resolution encoding.

Different from step 307E, in a case that the previous frame uses the full-resolution encoding, a terminal does not need to perform offset processing on the average quantization parameter by using the first quantization parameter offset, that is, directly determines the average quantization parameter as the quantization parameter of the pre-determined code block.

For example, in a case that the previous frame is a P frame and uses the full-resolution encoding, the video encoding device calculates the quantization parameter of the pre-determined code block as 30 with reference to examples in steps 307A and 307B.

In step 308, the downsampling encoding is determined as a target encoding manner in a case that the quantization parameter estimation value is greater than the quantization parameter threshold.

After the quantization parameter threshold and the quantization parameter estimation value of the current video frame are obtained through steps 301 to 307, the video encoding device determines, by comparing the quantization parameter estimation value with the quantization parameter threshold, a target encoding manner used for the video frame.

For example, when the obtained quantization parameter threshold is 33, and the quantization parameter estimation value is 36, the video encoding device determines the downsampling encoding as the target encoding manner of the video frame.

In step 309, the video encoding device determines the full-resolution encoding as the target encoding manner in a case that the quantization parameter estimation value is less than the quantization parameter threshold.

For example, when the obtained quantization parameter threshold is 36, and the quantization parameter estimation value is 32, the video encoding device determines the full-resolution encoding as the target encoding manner of the video frame.

In step 310, the video encoding device corrects the quantization parameter estimation value according to the first quantization parameter offset in a case that the video frame uses the downsampling encoding, and encodes the video frame according to the corrected quantization parameter.

After the target encoding manner is determined through step 309 or 310, the video encoding device encodes the current video frame by using the target encoding manner, and inputs the encoded video frame into the encoder. The encoder performs code rate control on the encoded video frame according to the quantization parameter estimation value.

To avoid an abrupt change in video quality during switching of full-resolution/downsampling encoding, when the downsampling encoding is performed on the video frame, and before the encoder performs the code rate control, the video encoding device corrects the quantization parameter estimation value according to the first quantization parameter offset. The corrected quantization parameter=quantization parameter estimation value−first quantization parameter offset.

Further, when the fixed quality encoding is used, a quantization parameter estimation value of a downsampling frame (a video frame subjected to the downsampling encoding) is a quantization parameter of actual encoding. When the fixed code rate encoding is used, a quantization parameter estimation value corresponding to a downsampling frame is the quantization parameter of the preset code block.

In this embodiment, the quantization parameter estimation value is corrected by using the first quantization parameter offset that is set in advance, to avoid an abrupt change in video quality during switching of full-resolution encoding and downsampling encoding, and maintain stable video quality. At the same time, overall compression efficiency of a video is improved by setting the second quantization parameter offset in advance.

In this embodiment, when the current video frame is not the first frame, the video encoding device obtains a quantization parameter estimation value of the current video frame based on an average quantization parameter of a previous frame, thereby improving accuracy of the quantization parameter estimation value, and further improving accuracy of an encoding manner selected subsequently.

In this embodiment, an average intra-frame pre-coding cost of each pixel in the video frame is calculated, and a relatively large quantization parameter threshold is set when the average intra-frame pre-coding cost is relatively large, so that the full-resolution encoding tends to be selected subsequently, thereby avoiding a problem of video picture distortion caused due to a heavy information loss by using downsampling encoding when an amount of information of the video frame is relatively large.

The following describes an apparatus embodiment of the present disclosure. For details not described in the apparatus embodiment, refer to the foregoing method embodiment that is in a one-to-one correspondence with the apparatus embodiment.

Figure 5:
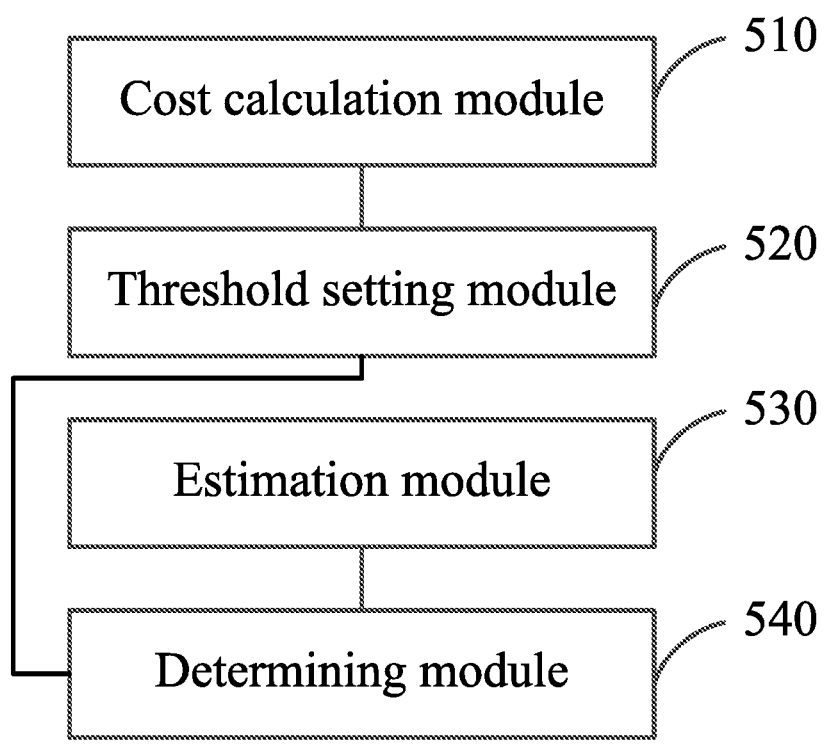
FIG. 5 is a structural block diagram of a video encoding apparatus according to an embodiment of this application.

FIG. 5 is a structural block diagram of a video encoding apparatus according to an embodiment of the present disclosure. The video encoding apparatus may be implemented as all or a part of a video encoding device. The apparatus includes a cost calculation module 510, a threshold setting module 520, an estimation module 530, and a determining module 540. One or more of the modules of the video encoding apparatus can be implemented by processing circuitry. The cost calculation module 510 is configured to calculate an intra-frame pre-coding cost of a video frame. The intra-frame pre-coding cost is used for representing richness and a spatial correlation degree of details in the video frame. The threshold setting module 520 is configured to set a quantization parameter threshold of the video frame according to the intra-frame pre-coding cost. The estimation module 530 is configured to calculate a quantization parameter estimation value of the video frame. The quantization parameter estimation value is used for representing a predicted compression status of the details in the video frame. The determining module 540 is configured to determine a target encoding manner corresponding to the video frame according to the quantization parameter threshold and the quantization parameter estimation value. The target encoding manner includes full-resolution encoding or downsampling encoding.

Optionally, the determining module 540 includes a first determining unit and a second determining unit. The first determining unit is configured to determine the downsampling encoding as the target encoding manner in a case that the quantization parameter estimation value is greater than the quantization parameter threshold. The second determining unit is configured to determine the full-resolution encoding as the target encoding manner in a case that the quantization parameter estimation value is less than the quantization parameter threshold.

Optionally, the cost calculation module 510 includes a downsampling unit, a first calculation unit, and a third determining unit. The downsampling unit is configured to perform downsampling on the video frame. The first calculation unit is configured to divide the downsampled video frame into a plurality of code blocks, and pre-code the code blocks, to calculate pre-coding costs of the code blocks. The third determining unit is configured to determine a sum of the pre-coding costs of the code blocks as the intra-frame pre-coding cost.

Optionally, the threshold setting module 520 includes a second calculation unit, a first setting unit, and a second setting unit. The second calculation unit is configured to calculate an average intra-frame pre-coding cost of each pixel according to the intra-frame pre-coding cost and a quantity of pixels of the video frame. The first setting unit is configured to set the quantization parameter threshold as a first value in a case that the average intra-frame pre-coding cost is greater than a preset cost threshold. The second setting unit is configured to set the quantization parameter threshold as a second value in a case that the average intra-frame pre-coding cost is less than the preset cost threshold, where the first value is greater than the second value.

Optionally, the estimation module 530 includes a fourth determining unit and a fifth determining unit. The fourth determining unit is configured to determine a preset quantization parameter as the quantization parameter estimation value in a case that the video frame is the first frame of a frame sequence. The fifth determining unit is configured to determine the quantization parameter estimation value according to an encoding mode used by an encoder in a case that the video frame is not the first frame of the frame sequence. The encoding mode includes fixed quality encoding and fixed code rate encoding. The fixed quality encoding refers to an encoding manner maintaining fixed video picture quality, and the fixed code rate encoding refers to an encoding manner maintaining a fixed video code rate.

Optionally, the fifth determining unit is configured to determine an external preset value of the encoder as the quantization parameter estimation value in a case that the encoding mode is the fixed quality encoding, where the external preset value is a quantization parameter preset by the encoder. The fifth determining unit is configured to calculate a quantization parameter of a pre-determined code block in the video frame in a case that the encoding mode is the fixed code rate encoding, and determine the quantization parameter of the pre-determined code block as the quantization parameter estimation value, where the pre-determined code block is the first code block of the video frame.

Optionally, the calculating a quantization parameter of a pre-determined code block in the video frame includes obtaining a first quantization parameter offset and a second quantization parameter offset, where the first quantization parameter offset is a difference between a downsampling encoding quantization parameter and a full-resolution encoding quantization parameter, and the second quantization parameter offset is a difference between an I-frame quantization parameter and a P-frame quantization parameter; calculating an average quantization parameter of a previous frame of the video frame, where the average quantization parameter is an average value of quantization parameters of code blocks in the previous frame; determining a sum of the average quantization parameter, the first quantization parameter offset, and the second quantization parameter offset as the quantization parameter of the pre-determined code block in a case that the previous frame is an I frame and uses the downsampling encoding; determining a sum of the average quantization parameter and the second quantization parameter offset as the quantization parameter of the pre-determined code block in a case that the previous frame is an I frame and uses the full-resolution encoding; determining a sum of the average quantization parameter and the first quantization parameter offset as the quantization parameter of the pre-determined code block in a case that the previous frame is a P frame and uses the downsampling encoding; and determining the average quantization parameter as the quantization parameter of the pre-determined code block in a case that the previous frame is a P frame and uses the full-resolution encoding.

Optionally, the apparatus further includes an encoding module, configured to correct the quantization parameter estimation value according to the first quantization parameter offset in a case that the video frame uses the downsampling encoding, and encode the video frame according to the corrected quantization parameter.

In conclusion, in this embodiment, before a video frame is encoded, pre-coding analysis is first performed on the video frame, to obtain an intra-frame pre-coding cost of the video frame, so that a quantization parameter threshold of the video frame is set according to the intra-frame pre-coding cost. During determining of an encoding manner used for encoding the video frame, a full-resolution or downsampling manner is used for encoding the video frame by comparing magnitudes of a quantization parameter estimation value and the quantization parameter threshold of the video frame. Compared with an encoding manner used in the related art, in this embodiment, richness and a compression status of details of the current video frame are considered in an encoding manner selecting process, so that the finally determined encoding manner accords with image characteristics of the video frame, thereby improving the video encoding effect.

In this embodiment, the quantization parameter estimation value is corrected by using the first quantization parameter offset that is set in advance, to avoid an abrupt change in video quality during switching of full-resolution encoding and downsampling encoding, and maintain stable video quality. At the same time, overall compression efficiency of a video is improved by setting the second quantization parameter offset in advance.

In this embodiment, when the current video frame is not the first frame, the video encoding device obtains a quantization parameter estimation value of the current video frame based on an average quantization parameter of a previous frame, thereby improving accuracy of the quantization parameter estimation value, and further improving accuracy of an encoding manner selected subsequently.

In this embodiment, an average intra-frame pre-coding cost of each pixel in the video frame is calculated, and a relatively large quantization parameter threshold is set when the average intra-frame pre-coding cost is relatively large, so that the full-resolution encoding tends to be selected subsequently, thereby avoiding a problem of video picture distortion caused due to a heavy information loss by using downsampling encoding when an amount of information of the video frame is relatively large.

In the video encoding apparatus provided in the foregoing embodiment, only divisions of the foregoing functional modules are described by using an example. During actual application, the foregoing functions may be allocated to and completed by different functional modules according to requirements, that is, the internal structure of the video encoding device is divided into different functional modules, to complete all or some of the foregoing described functions. In addition, the video encoding apparatus provided in the foregoing embodiment can belong to the same concept as the embodiment of the video encoding method. For a specific implementation process of the apparatus, refer to the method embodiment, and details are not described herein again.

Figure 6:
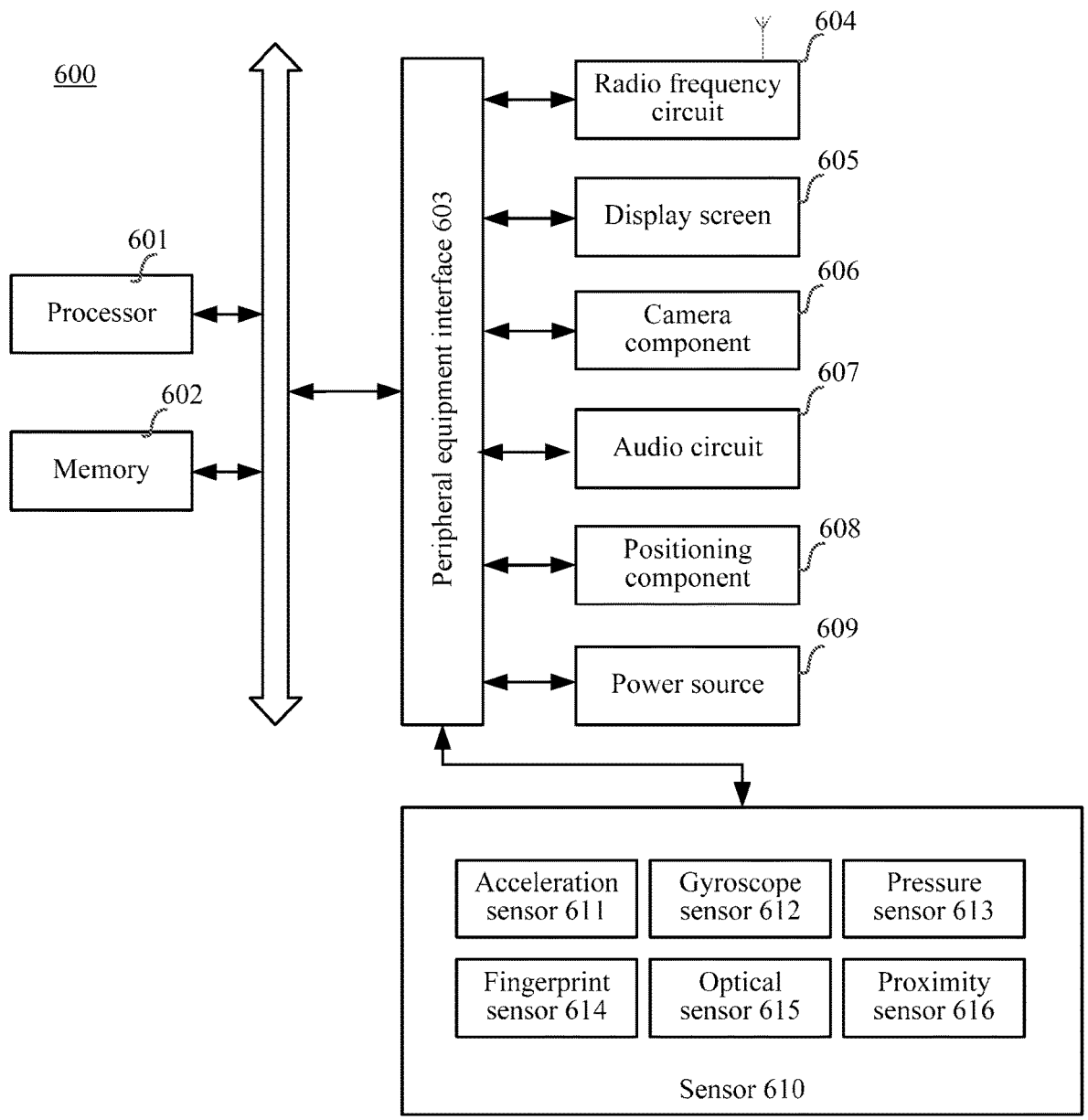
FIG. 6 is a structural block diagram of a terminal according to an exemplary embodiment of this application.

FIG. 6 is a structural block diagram of a terminal 600 according to an exemplary embodiment of the present disclosure. The terminal 600 may be a portable mobile terminal, for example, a smartphone, a tablet computer, a moving picture experts group audio/video layer III (MPEG-3) player, or a moving picture experts group audio/video layer IV (MPEG-4) player. The terminal 600 may also be referred to as other names such as user equipment and a portable terminal.

Generally, the terminal 600 includes a processor 601 and a memory 602.

The processor 601 (e.g., processing circuitry) may include one or more processing cores, for example, a 4-core processor or an 8-core processor. The processor 601 may be implemented in at least one hardware form of digital signal processing (DSP), a field-programmable gate array (FPGA), and a programmable logic array (PLA). The processor 601 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 601 may be integrated with a graphics processing unit (GPU). The GPU is configured to be responsible for rendering and drawing content that a display screen needs to display. In some embodiments, the processor 601 may further include an artificial intelligence (AI) processor. The AI processor is configured to process a computing operation related to machine learning.

The memory 602 may include one or more computer-readable storage media. The computer-readable storage medium may be tangible and non-transient. The memory 602 may further include a high-speed random access memory and a non-volatile memory, for example, one or more disk storage devices, or flash memory devices. In some embodiments, the non-transient (or non-transitory) computer-readable storage medium in the memory 602 is configured to store at least one instruction, and the at least one instruction is used for being executed by the processor 601 to implement the video encoding method provided in this application.

In some embodiments, the terminal 600 may optionally include: a peripheral interface 603 and at least one peripheral. Specifically, the peripheral includes: at least one of a radio frequency (RF) circuit 604, a touch display screen 605, a camera component 606, an audio frequency circuit 607, a positioning component 608, and a power source 609.

The peripheral interface 603 may be configured to connect the at least one peripheral related to input/output (I/O) to the processor 601 and the memory 602. In some embodiments, the processor 601, the memory 602 and the peripheral interface 603 are integrated on a same chip or circuit board. In some other embodiments, any one or two of the processor 601, the memory 602, and the peripheral interface 603 may be implemented on a single chip or circuit board. This is not limited in this embodiment.

The RF circuit 604 is configured to receive and transmit an RF signal, which is also referred as an electromagnetic signal. The RF circuit 604 communicates with a communications network and other communications devices by using the electromagnetic signal. The RF circuit 604 converts an electrical signal into an electromagnetic signal to be transmitted, or converts a received electromagnetic signal into an electrical signal. Optionally, the RF circuit 604 includes: an antenna system, an RF transceiver, one or more amplifiers, a tuner, an oscillator, a digital signal processor, a codec chipset, a subscriber identity module card, and the like. The RF circuit 604 may communicate with other terminals through at least one wireless communication protocol. The wireless communication protocol includes, but is not limited to: a world wide web, a metropolitan area network, an intranet, generations of mobile communication networks (2G, 3G, 4G, and 5G), a wireless local area network and/or a wireless (Wi-Fi) network. In some embodiments, the RF circuit 604 may also include a circuit related to near field communication (NFC). This is not limited in this application.

The touch display screen 605 is configured to display a user interface (UI). The UI may include a graphic, a text, an icon, a video, and any combination thereof. The touch display screen 605 also has a capability of collecting a touch signal on or above a surface of the touch display screen 605. The touch signal may be used as a control signal to be inputted into the processor 601 for processing. The touch display screen 605 is configured to provide a virtual button and/or a virtual keyboard, which is also referred to as a soft button and/or a soft keyboard. In some embodiments, there may be one touch display screen 605, disposed on a front panel of the terminal 600. In some other embodiments, there may be at least two touch display screens 605, disposed on different surfaces of the terminal 600 respectively or in a folded design. In some more embodiments, the touch display screen 605 may be a flexible display screen, disposed on a curved surface or a folded surface of the terminal 600. Even, the touch display screen 605 may be further set in a non-rectangular irregular pattern, namely, a special-shaped screen. The touch display screen 605 may be made of a material such as a liquid crystal display (LCD) or an organic light-emitting diode (OLED).

The camera component 606 is configured to collect an image or a video. Optionally, the camera component 606 includes a front-facing camera and a rear-facing camera. Generally, the front-facing camera is configured to implement a video call or self-portrait. The rear-facing camera is configured to shooting a picture or a video. In some embodiments, there are at least two rear-facing cameras, each of which is any one of a main camera, a depth of field camera and a wide-angle camera, so as to implement a background blurring function by fusing the main camera and the depth of field camera, and panoramic shooting and virtual reality (VR) shooting functions by fusing the main camera and the wide-angle camera. In some embodiments, the camera component 606 may further include a flash. The flash may be a monochrome temperature flash, or may be a double color temperature flash. The double color temperature flash refers to a combination of a warm light flash and a cold light flash, and may be used for light compensation under different color temperatures.

The audio frequency circuit 607 is configured to provide an audio interface between a user and the terminal 600. The audio frequency circuit 607 may include a microphone and a speaker. The microphone is configured to collect a sound wave of a user and an environment, and convert the sound wave into the electrical signal to be input to the processor 601 for processing, or to be input to the RF circuit 604 for implementing voice communication. For the purpose of stereo collection or noise reduction, there may be a plurality of microphones, disposed at different portions of the terminal 600 respectively. The microphone may be further an array microphone or an omni-directional collection type microphone. The speaker is configured to convert the electrical signal from the processor 601 or the RF circuit 604 into the sound wave. The speaker may be a conventional film speaker, or may be a piezoelectric ceramic speaker. When the speaker is the piezoelectric ceramic speaker, not only can the electrical signal be converted into a sound wave audible to a human being, but also the electrical signal can be converted into a sound wave inaudible to the human being for ranging and the like. In some embodiments, the audio frequency circuit 607 may alternatively include an earphone jack.

The positioning component 608 is configured to position a current geographic location of the terminal 600 to implement navigation or a location based service (LBS). The positioning component 608 may be a positioning component based on a global positioning system (GPS) of the United States, a Beidou system of China, or a Galileo system of Russia.

The power source 609 is configured to supply power for the components in the terminal 600. The power source 609 may be an alternating current, a direct current, a disposable battery, or a rechargeable battery. When the power source 609 includes the rechargeable battery, the rechargeable battery may be a wired rechargeable battery or a wireless rechargeable battery. The wired rechargeable battery is a battery charged through a wired line. The wireless rechargeable battery is a battery charged through a wireless coil. The rechargeable battery may be further configured to support a fast charge technology.

In some embodiments, the terminal 600 further includes one or more sensors 610. The one or more sensors 610 include but are not limited to: an acceleration sensor 611, a gyroscope sensor 612, a pressure sensor 613, a fingerprint sensor 614, an optical sensor 615, and a proximity sensor 616.

The acceleration sensor 611 may detect the magnitude of acceleration on three coordinate axes of a coordinate system established with the terminal 600. For example, the acceleration sensor 611 may be configured to detect components of gravity acceleration on the three coordinate axes. The processor 601 may control, according to a gravity acceleration signal collected by the acceleration sensor 611, the touch display screen 605 to display the user interface in a transverse view or a longitudinal view. The acceleration sensor 611 may be further configured to collect motion data of a game or a user.

The gyroscope sensor 612 may detect a body direction and a rotation angle of the terminal 600. The gyroscope sensor 612 may cooperate with the acceleration sensor 611 to collect a 3D action by the user on the terminal 600. The processor 601 may implement the following functions according to the data collected by the gyroscope sensor 612: motion sensing (e.g., changing the UI according to a tilt operation of the user), image stabilization at shooting, game control, and inertial navigation.

The pressure sensor 613 may be disposed at a side frame of the terminal 600 and/or a lower layer of the touch display screen 605. When the pressure sensor 613 is disposed at the side frame of the terminal 600, a holding signal of the user on the terminal 600 may be detected, and left/right hand identification and a quick action may be performed according to the holding signal. When the pressure sensor 613 is disposed at the lower layer of the touch display screen 605, an operable control on the UI interface can be controlled according to a pressure operation of the user on the touch display screen 605. The operable control includes at least one of a button control, a scroll-bar control, an icon control and a menu control.

The fingerprint sensor 614 is configured to collect a user's fingerprint to identify a user's identity according to the collected fingerprint. When identifying that the user's identity is a trusted identity, the processor 601 authorizes the user to perform related sensitive operations. The sensitive operations include: unlocking a screen, viewing encryption information, downloading software, paying, changing a setting, and the like. The fingerprint sensor 614 may be disposed on a front surface, a back surface, or a side surface of the terminal 600. When a physical button or a vendor logo is disposed on the terminal 600, the fingerprint sensor 614 may be integrated with the physical button or the vendor logo.

The optical sensor 615 is configured to collect ambient light intensity. In an embodiment, the processor 601 may control display brightness of the touch display screen 605 according to the ambient light intensity collected by the optical sensor 615. Specifically, when the ambient light intensity is relatively high, the display brightness of the touch display screen 605 is turned up. When the ambient light intensity is relatively low, the display brightness of the touch display screen 605 is turned down. In another embodiment, the processor 601 may further dynamically adjust a shooting parameter of the camera component 606 according to the ambient light intensity collected by the optical sensor 615.

The proximity sensor 616, also referred to as a distance sensor, is generally disposed on the front surface of the terminal 600. The proximity sensor 616 is configured to collect a distance between the user and the front surface of the terminal 600. In an embodiment, when the proximity sensor 616 detects that the distance between the user and the front surface of the terminal 600 gradually becomes smaller, the touch display screen 605 is controlled by the processor 601 to switch from a screen-on state to a screen-off state. In a case that the proximity sensor 616 detects that the distance between the user and the front surface of the terminal 600 gradually becomes larger, the touch display screen 605 is controlled by the processor 601 to switch from the screen-off state to the screen-on state.

A person skilled in the art may understand that the structure shown in FIG. 6 is exemplary constitutes no limitation on the terminal 600, and the terminal may include more or fewer components than those shown in the figure, or some components may be combined, or a different component deployment may be used.

An embodiment of this application further provides a video encoding device, including a processor and a memory, the memory storing at least one instruction, at least one program, and a code set or an instruction set, and the at least one instruction, the at least one program, and the code set or the instruction set being loaded and executed by the processor to implement the video encoding method according to the foregoing embodiments.

An embodiment of this application further provides a computer-readable storage medium (e.g., a non-transitory computer-readable storage medium), the storage medium storing at least one instruction, at least one program, and a code set or an instruction set, and the at least one instruction, the at least one program, and the code set or the instruction set being loaded and executed by a processor to implement the video encoding method according to the foregoing embodiments.

Optionally, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The sequence numbers of the foregoing embodiments of this application are merely for the convenience of description, and do not imply the preference among the embodiments.

The sequence numbers of the embodiments of the present disclosure are merely for the convenience of description, and do not imply the preference among the embodiments.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A video encoding method, comprising:
    calculating, by processing circuitry of an video encoding apparatus, an intra-frame pre-coding cost of a video frame to be encoded, the intra-frame pre-coding cost indicating an amount of information in the video frame and a spatial correlation degree of the information in a plurality of code blocks of the video frame;
    setting, by the processing circuitry, a quantization parameter threshold of the video frame according to the intra-frame pre-coding cost;
    calculating, by the processing circuitry, a quantization parameter estimation value of the video frame, the quantization parameter estimation value indicating a predicted compression status of the information in the video frame; and
    determining, by the processing circuitry, which of full-resolution encoding and downsampling encoding is a target encoding manner of the video frame according to the quantization parameter threshold and the quantization parameter estimation value.

2. The method according to claim 1, wherein the determining comprises:
    determining the target encoding manner is the downsampling encoding based on the quantization parameter estimation value being greater than the quantization parameter threshold; and
    determining the target encoding manner is the full-resolution encoding based on the quantization parameter estimation value being less than the quantization parameter threshold.

3. The method according to claim 1, wherein the calculating the intra-frame pre-coding cost of the video frame comprises:
    performing downsampling on the video frame;
    dividing the downsampled video frame into the plurality of code blocks, and pre-coding the plurality of code blocks, to calculate pre-coding costs of the plurality of code blocks; and
    determining the intra-frame pre-coding cost based on a sum of the pre-coding costs of the plurality of code blocks.

4. The method according to claim 1, wherein the setting the quantization parameter threshold of the video frame comprises:
    calculating an average intra-frame pre-coding cost of each pixel according to the intra-frame pre-coding cost and a quantity of pixels of the video frame;
    setting the quantization parameter threshold as a first value based on the average intra-frame pre-coding cost being greater than a cost threshold; and
    setting the quantization parameter threshold as a second value based on the average intra-frame pre-coding cost being less than the cost threshold, the first value being greater than the second value.

5. The method according to claim 1, wherein the calculating the quantization parameter estimation value of the video frame comprises:
   determining the quantization parameter estimation value is a preset quantization parameter based on the video frame being a first frame of a frame sequence; and
   determining the quantization parameter estimation value according to an encoding mode used by an encoder based on the video frame not being the first frame of the frame sequence, wherein
   the encoding mode is one of fixed quality encoding and fixed code rate encoding, the fixed quality encoding maintains a fixed video picture quality, and the fixed code rate encoding maintains a fixed video code rate.

6. The method according to claim 5, wherein the determining the quantization parameter estimation value according to the encoding mode comprises:
   determining the quantization parameter estimation value is an external preset value of the encoder based on the encoding mode being the fixed quality encoding, the external preset value being a quantization parameter preset by the encoder; and
   calculating a quantization parameter of a code block of the plurality of code blocks in the video frame based on the encoding mode being the fixed code rate encoding, and determining the quantization parameter of the code block as the quantization parameter estimation value, the code block being a first code block of the video frame.

7. The method according to claim 6, wherein the calculating the quantization parameter of the code block of the plurality of code blocks in the video frame comprises:
   obtaining a first quantization parameter offset and a second quantization parameter offset, the first quantization parameter offset being a difference between a downsampling encoding quantization parameter and a full-resolution encoding quantization parameter, and the second quantization parameter offset being a difference between an I-frame quantization parameter and a P-frame quantization parameter;
   calculating an average quantization parameter of a previous frame of the video frame, the average quantization parameter being an average value of quantization parameters of a plurality of code blocks in the previous frame;
   determining the quantization parameter of the code block based on a sum of the average quantization parameter, the first quantization parameter offset, and the second quantization parameter offset based on the previous frame being an I frame and the target encoding manner being the downsampling encoding;
   determining the quantization parameter of the code block based on a sum of the average quantization parameter and the second quantization parameter offset based on the previous frame being an I frame and the target encoding manner being the full-resolution encoding;
   determining the quantization parameter of the code block based on a sum of the average quantization parameter and the first quantization parameter offset based on the previous frame being a P frame and the target encoding manner being the downsampling encoding; and
   determining the quantization parameter of the code block based on the average quantization parameter based on the previous frame being a P frame and the target encoding manner being the full-resolution encoding.

8. The method according to claim 7, further comprising:
   correcting the quantization parameter estimation value according to the first quantization parameter offset based on the target encoding manner being the downsampling encoding; and
   encoding the video frame according to the corrected quantization parameter.

9. The method according to claim 1, wherein the information in the video frame corresponds to pixels in the video frame.

10. A video encoding apparatus, comprising:
    processing circuitry configured to
      calculate an intra-frame pre-coding cost of a video frame to be encoded, the intra-frame pre-coding cost indicating an amount of information in the video frame and a spatial correlation degree of the information in a plurality of code blocks of the video frame;
      set a quantization parameter threshold of the video frame according to the intra-frame pre-coding cost;
      calculate a quantization parameter estimation value of the video frame, the quantization parameter estimation value indicating a predicted compression status of the information in the video frame; and
      determine which of full-resolution encoding and downsampling encoding is a target encoding manner of the video frame according to the quantization parameter threshold and the quantization parameter estimation value.

11. The video encoding apparatus according to claim 10, wherein the processing circuitry is configured to
    determine the target encoding manner is the downsampling encoding based on the quantization parameter estimation value being greater than the quantization parameter threshold; and
    determine the target encoding manner is the full-resolution encoding based on the quantization parameter estimation value being less than the quantization parameter threshold.

12. The video encoding apparatus according to claim 10, wherein the processing circuitry is configured to
    perform downsampling on the video frame;
    divide the downsampled video frame into the plurality of code blocks, and pre-code the plurality of code blocks, to calculate pre-coding costs of the plurality of code blocks; and
    determine the intra-frame pre-coding cost based on a sum of the pre-coding costs of the plurality of code blocks.

13. The video encoding apparatus according to claim 10, wherein the processing circuitry is configured to
    calculate an average intra-frame pre-coding cost of each pixel according to the intra-frame pre-coding cost and a quantity of pixels of the video frame;
    set the quantization parameter threshold as a first value based on the average intra-frame pre-coding cost being greater than a cost threshold; and
    set the quantization parameter threshold as a second value based on the average intra-frame pre-coding cost being less than the cost threshold, the first value being greater than the second value.

14. The video encoding apparatus according to claim 10, wherein
    the processing circuitry is configured to
      determine the quantization parameter estimation value is a preset quantization parameter based on the video frame being a first frame of a frame sequence; and determine the quantization parameter estimation value according to an encoding mode used by an encoder based on the video frame not being the first frame of the frame sequence, and the encoding mode is one of fixed quality encoding and fixed code rate encoding, the fixed quality encoding maintains a fixed video picture quality, and the fixed code rate encoding maintains a fixed video code rate.

15. The video encoding apparatus according to claim 14, wherein the processing circuitry is configured to determine the quantization parameter estimation value is an external preset value of the encoder based on the encoding mode being the fixed quality encoding, the external preset value being a quantization parameter preset by the encoder; and calculate a quantization parameter of a code block of the plurality of code blocks in the video frame based on the encoding mode being the fixed code rate encoding, and determine the quantization parameter of the code block as the quantization parameter estimation value, the code block being a first code block of the video frame.

16. The video encoding apparatus according to claim 15, wherein the processing circuitry is configured to obtain a first quantization parameter offset and a second quantization parameter offset, the first quantization parameter offset being a difference between a downsampling encoding quantization parameter and a full-resolution encoding quantization parameter, and the second quantization parameter offset being a difference between an I-frame quantization parameter and a P-frame quantization parameter;

calculate an average quantization parameter of a previous frame of the video frame, the average quantization parameter being an average value of quantization parameters of a plurality of code blocks in the previous frame;

determine the quantization parameter of the code block based on a sum of the average quantization parameter, the first quantization parameter offset, and the second quantization parameter offset based on the previous frame being an I frame and the target encoding manner being the downsampling encoding;

determine the quantization parameter of the code block based on a sum of the average quantization parameter and the second quantization parameter offset based on the previous frame being an I frame and the target encoding manner being the full-resolution encoding;

determine the quantization parameter of the code block based on a sum of the average quantization parameter and the first quantization parameter offset based on the previous frame being a P frame and the target encoding manner being the downsampling encoding; and determine the quantization parameter of the code block based on the average quantization parameter based on the previous frame being a P frame and the target encoding manner being the full-resolution encoding.

17. The video encoding apparatus according to claim 16, wherein the processing circuitry is configured to correct the quantization parameter estimation value according to the first quantization parameter offset based on the target encoding manner being the downsampling encoding; and encode the video frame according to the corrected quantization parameter.

18. The video encoding apparatus according to claim 10, wherein the information in the video frame corresponds to pixels in the video frame.

19. A non-transitory computer-readable storage medium storing instructions which when executed by at least one processor cause the at least one processor to perform:

calculating an intra-frame pre-coding cost of a video frame to be encoded, the intra-frame pre-coding cost indicating an amount of information in the video frame and a spatial correlation degree of the information in a plurality of code blocks of the video frame;

setting a quantization parameter threshold of the video frame according to the intra-frame pre-coding cost;

calculating a quantization parameter estimation value of the video frame, the quantization parameter estimation value indicating a predicted compression status of the information in the video frame; and determining which of full-resolution encoding and downsampling encoding is a target encoding manner of the video frame according to the quantization parameter threshold and the quantization parameter estimation value.

20. The non-transitory computer-readable storage medium according to claim 19, wherein the information in the video frame corresponds to pixels in the video frame.

* * * * *